W. E. BALL.
Improvement in Nut-Locks.
No. 130,689.　　　　　　　　　　　Patented Aug. 20, 1872.
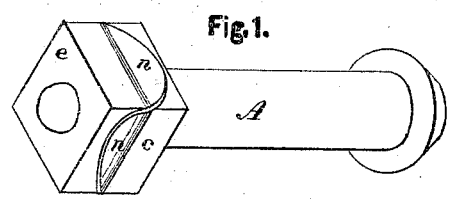
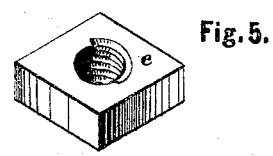
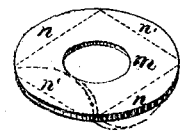
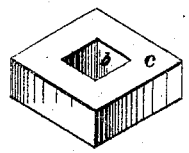
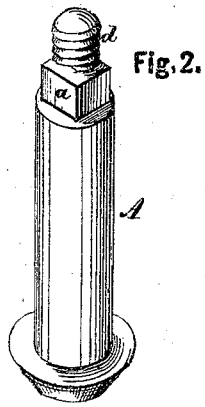

UNITED STATES PATENT OFFICE.

WILLIAM E. BALL, OF BETHESDA, OHIO.

IMPROVEMENT IN NUT-LOCKS.

Specification forming part of Letters Patent No. 130,689, dated August 20, 1872.

Specification of certain Improvements in Nut-Locks, invented by WILLIAM E. BALL, of Bethesda, in the county of Belmont and State of Ohio.

Nature and Objects of the Invention.

This invention consists of a screw-bolt having a part of its length next the screw-thread squared to receive a square collar, the square collar and nut being connected together by a flexible washer situated between them, and having two of its sides bent around the square collar and the other two around the nut to prevent it from turning, as hereinafter more fully set forth.

Description of the Accompanying Drawing.

Figure 1 is a perspective view of a bolt and nut with my locking device applied. Fig. 2 is a perspective view of the bolt. Fig. 3 is a perspective view of the square collar. Fig. 4 is a perspective view of the flexible washer, the dotted lines indicating the projecting portions, which are turned up and down after the collar and nut are in position. Fig. 5 is a perspective view of the nut.

General Description.

A represents a bolt, a part, $a$, near the thread end, of which is made square, so that it may fit a corresponding perforation, $b$, made in the center of the square collar $c$. By this construction the collar $c$ may readily be withdrawn from the bolt by moving it endwise of the latter; but the collar cannot be turned on the bolt. The end $d$ of the bolt is screw-threaded, as seen in the drawing, for its insertion into the nut $e$, having a perforation at its center similarly threaded. $m$ is a flexible washer provided with a perforation at its center to receive the bolt. This washer may be made of circular form. It is placed between the collar and nut $e$, and as it has a diameter equal to the diagonals of the said collar and nut it projects beyond their square sides at $n$ $n$ $n'$ $n'$. The projections $n$ $n$ of the flexible washer are bent around the collar $c$, and the projections $n'$ $n'$ around the nut $e$, thus fastening them together and preventing the turning of the nut, because it is securely connected with the collar $c$, which is incapable of turning on the bolt, while the said collar cannot be withdrawn from the bolt in the direction of its length because of the screw connection between the nut $e$ and bolt.

Claim.

What I claim as new and of my invention is—

The bolt A, constructed as described, in combination with the collar $c$ provided with a square perforation at its center nut $e$, and flexible washer having projections $n$ $n$ $n'$ $n'$, the said nut and collar being tied together by the flexible washer, as and for the purpose set forth.

WILLIAM E. BALL.

Witnesses:
L. S. THOMPSON,
JOHN J. HESKETT.